(12) United States Patent
McEwan

(10) Patent No.: US 6,466,168 B1
(45) Date of Patent: Oct. 15, 2002

(54) DIFFERENTIAL TIME OF FLIGHT MEASUREMENT SYSTEM

(75) Inventor: Thomas E. McEwan, Carmel Highlands, CA (US)

(73) Assignee: McEwen Technologies, LLC, Monterey, CA (US)

( * ) Notice: Subject to any disclaimer, the term of this patent is extended or adjusted under 35 U.S.C. 154(b) by 0 days.

(21) Appl. No.: 09/641,063

(22) Filed: Aug. 17, 2000

(51) Int. Cl.[7] .................................................. G01S 3/02
(52) U.S. Cl. ...................................................... 342/465
(58) Field of Search ......................................... 342/465

(56) References Cited

U.S. PATENT DOCUMENTS 5,589,838 A  * 12/1996  McEwan ..................... 342/387
5,920,288 A  *  7/1999  Sorrells ....................... 342/465
6,250,601 B1 *  6/2001  Kolar et al. ............. 251/129.04

* cited by examiner

*Primary Examiner*—Theodore M. Blum
(74) *Attorney, Agent, or Firm*—Mark A. Haynes; Haynes Beffel & Wolfeld LLP

(57) ABSTRACT

A bi-static radar configuration measures the time-of-flight of an RF burst using differentially-configured sampling receivers. A precise differential measurement is made by simultaneously sampling a reference signal line and a free-space time-of-flight RF burst signal using separate sampling receivers having common sample timing. Two alternative sample timing systems may be used with the sampling receivers: (1) a swept delay using a delay locked loop (DLL), or (2) two precision oscillators slightly offset in frequency from each other. The receiver outputs are processed into a PWM signal to indicate antenna-to-antenna time-of-flight range or to indicate material properties. Applications include robotics, safety, material thickness measurement, material dielectric constant measurement, such as for fuel or grain moisture measurement, and through-tank fill-level measurement.

16 Claims, 3 Drawing Sheets

DIFFERENTIAL TIME OF FLIGHT MEASUREMENT SYSTEM

BACKGROUND OF THE INVENTION

1. Field of the Invention

The present invention relates to high resolution position measurement systems, and more particularly to sub-millimeter resolution, equivalent time bi-static radar time-of-flight radio location systems operating over a range of less than about 100 feet.

2. Description of Related Art

High-resolution bi-static time-of-flight measurement systems employing equivalent time sampling techniques are not common. U.S. Pat. No. 4,01,459, "Systems for the Detection of Moving Objects within a Survey Area by Microwave Diffraction" by Jorgen et al and U.S. Pat. No. 5,576,626, "Narrow Field Electromagnetic Sensor System and Method" by McEwan both show bi-static RF beam interruption systems that do not provide time-of-flight measurement. U.S. Pat. No. 5,589,838, "Short Range Radio Locator System" by McEwan and U.S. Pat. No. 6,054,950, "Ultra Wideband Precision Geolocation System" by Fontana relate to un-tethered transmitters or receivers operating on a time-of-arrival basis requiring N+1 positions to triangulate an N-dimensional fix. In contrast, time-of-flight techniques require only N positions for an N-dimensional fix.

U.S. Pat. Nos. 5,510,800 and 5,661,490, "Time-of-Flight Radio Location System" by McEwan are relevant prior art. These patents disclose a pulsed transmitter combined with a sampling receiver that samples with swept timing to form an equivalent time replica of a received RF burst, which is processed to indicate the time-of-flight from a transmitter. The transmitter and receiver operate with controlled timing provided by a hard-wire. The limitation in these systems has to do with timing architecture: a reset pulse initiates the start of time-of-flight timing and the receipt of a time-of-flight RF pulse ends of timing. Unfortunately, the reset pulse is not tightly related to the RF time-of-flight and offers no solid means or method to track out delay path variations and compensate inevitable timing skews on the sub-nanosecond level. The prior art does not disclose a means or method to effectively compensate timing skews.

SUMMARY OF THE INVENTION

The present invention is a bi-static radar time-of-flight measurement system using differentially-configured sampling receivers to cancel timing skews. A transmitter transmits RF pulses in response to a transmit timing signal. A first sampling receiver samples the transmitted pulses in response to a receive timing signal to produce an equivalent time replica of received RF pulses. A second sampling receiver samples the transmit timing signal to form an equivalent time timing reference, which indicates the initiation of the transmitted RF pulse. This timing reference starts a time-of-flight counter. A detected time-of-flight pulse from the first receiver terminates the time-of-flight counter. The counter thereby indicates the time-of-flight from the first receiver minus systematic delays detected by the second receiver. The two receivers operate differentially with regard to timing delays.

The transmit and receive timing signals can be provided by several techniques including: (1) a swept delay provided by a delay locked loop (DLL) or (2) a phase-slipped delay provided by two precision but slightly frequency-offset oscillators.

A primary object of the present invention is to provide a high accuracy time-of-flight range measurement system.

Applications include low cost rangefinder radars for robotic and industrial controls, fluid level sensing radars, and through tank fill-level measurements.

DETAILED DESCRIPTION OF THE INVENTION

A detailed description of the present invention is provided below with reference to the figures. All U.S. Patents and copending U.S. applications cited herein are herein incorporated by reference.

Figure 1:
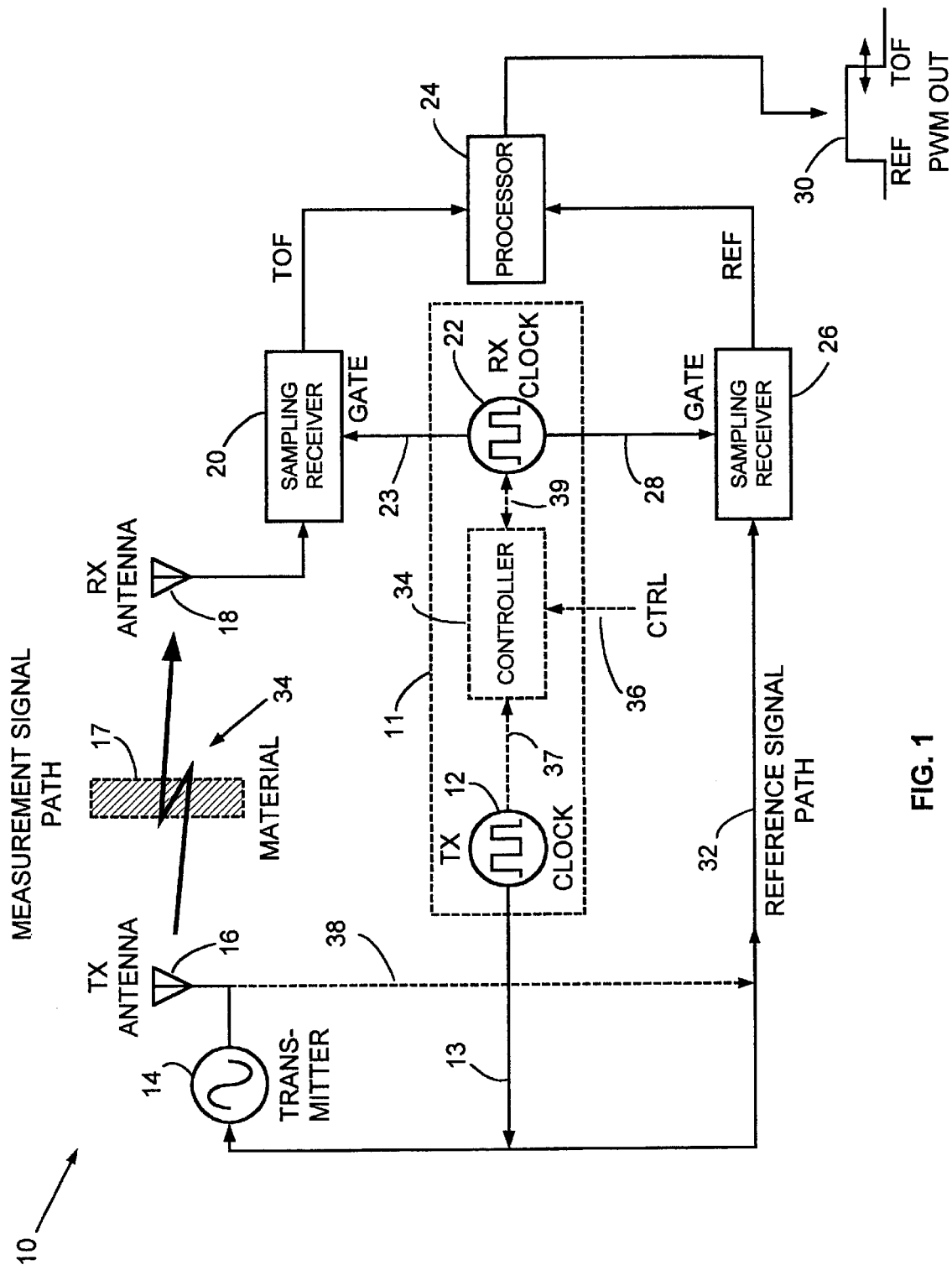
FIG. 1 is a block diagram of a differential time-of-flight measurement system of the present invention employing a two-oscillator timing system.

FIG. 1 shows a general differential time-of-flight transmitter-receiver or transceiver system 10 of the present invention based on a two-oscillator timing system 11. A transmit TX clock 12 produces transmit clock pulses on line 13 to drive a transmitter 14 which may be part of an impulse radar, a pulsed RF radar, a pulsed laser, a pulsed radio, or even a pulsed ultrasonic source. The transmitter 14 is coupled to a transducer 16, e.g., TX antenna, for radiation into a propagating medium 17. The transducer 16 may be an antenna, a laser diode and lens, or an acoustic transducer. Medium 17 may be water or oil in a tank, wood in a lumber mill, or other material.

A receive transducer 18, e.g., RX antenna, receives signals radiated by transducer 16 and passing through medium 17, and couples electrical pulses to a first receiver 20, which is a gated sampling type receiver, such as that described in U.S. Pat. No. 6,060,915, "Charge Transfer Wideband Sample-Hold Circuit", by McEwan. The gate pulses to receiver 20 are obtained from receive RX clock oscillator 22 via line 23. Receiver 20 outputs individual samples, or a number of integrated samples, to a baseband processor 24 which generally contains amplifiers, filters, envelope detectors and other elements common to equivalent time receivers, such as disclosed in copending application, "Precision Short-Range Pulse-Echo Systems With Automatic Pulse Detectors", Ser. No. 09/120,994, by McEwan. The processor output generally includes a pulse width modulation (PWM) pulse PWM OUT having a pulse width proportional to the time-of-flight from the TX antenna to the RX antenna, in expanded, i.e., equivalent time.

A second receiver 26 receives transmit clock pulses on line 13 to transmitter 14 via conductor (reference signal path) 32 (or, optionally, the RF pulses on conductor 38) and outputs individual samples, or a number of integrated samples, to baseband processor 24. Gate pulses to receiver 26 are obtained from RX clock oscillator 22 via line 28, which generally carries identically the same clock pulses as line 23. Processor 24 forms a PWM pulse 30, which starts with a pulse from receiver 26, labeled REF, and ends with a pulse from receiver 20, labeled TOF. Thus, the width of the PWM pulse depends on the difference in propagation time between the reference signal path 32 and the time-of-flight path 34 so common delays and drift between the two paths subtract out. Common delays include cable delays associated with antennas 16, 18, reference signal path 32 delays and receiver 20, 26 delays.

A precision timing system 11 is based on two precision clock oscillators 12, 22 having oscillation frequencies $F_T$ and $F_R$, respectively. The oscillators are offset by a small amount $F - F_R = \Delta$. TX clock oscillator 12 operates at frequency FT and triggers transmit RF pulses, and RX clock oscillator 22 operates at frequency $F_R$ and triggers sampling gates in the receivers. Due to the small frequency difference $\Delta$, the timing of the sampling GATE pulse smoothly and linearly slips in phase (i.e., time) relative to the TX clock such that one full cycle is slipped every $1/\Delta$ seconds.

This slow phase slip creates a time expansion effect proportional to $F_T/\Delta$ (~100,000 typically). Due to the expansion effect, events on a picosecond scale are converted to an easily measurable microsecond scale. Optionally, TX clock oscillator 12 may be set to a precise frequency $F_T$ and RX clock oscillator 22 may be locked to a desired offset frequency $\Delta(F_R = NF_T - \Delta)$, N=1,2,3 . . . by controller 34 in response to control inputs via line 36 and phase inputs from clocks 12, 22 via lines 37, 39. The control inputs may include an offset reference frequency and feedback from either sampling receiver. This two-oscillator approach has been described in U.S. Pat. No. 6,072,427, "Precision Radar Timebase Using Harmonically Related Offset Oscillators" by McEwan, in patent application Ser. No. 09/282,947, now U.S. Pat. No. 6,373,428, "Self Locking Dual Frequency Clock System" by McEwan, and in patent application Ser. No. 091641,115, "Spread Spectrum Radar Clock" by McEwan.

Figure 2:
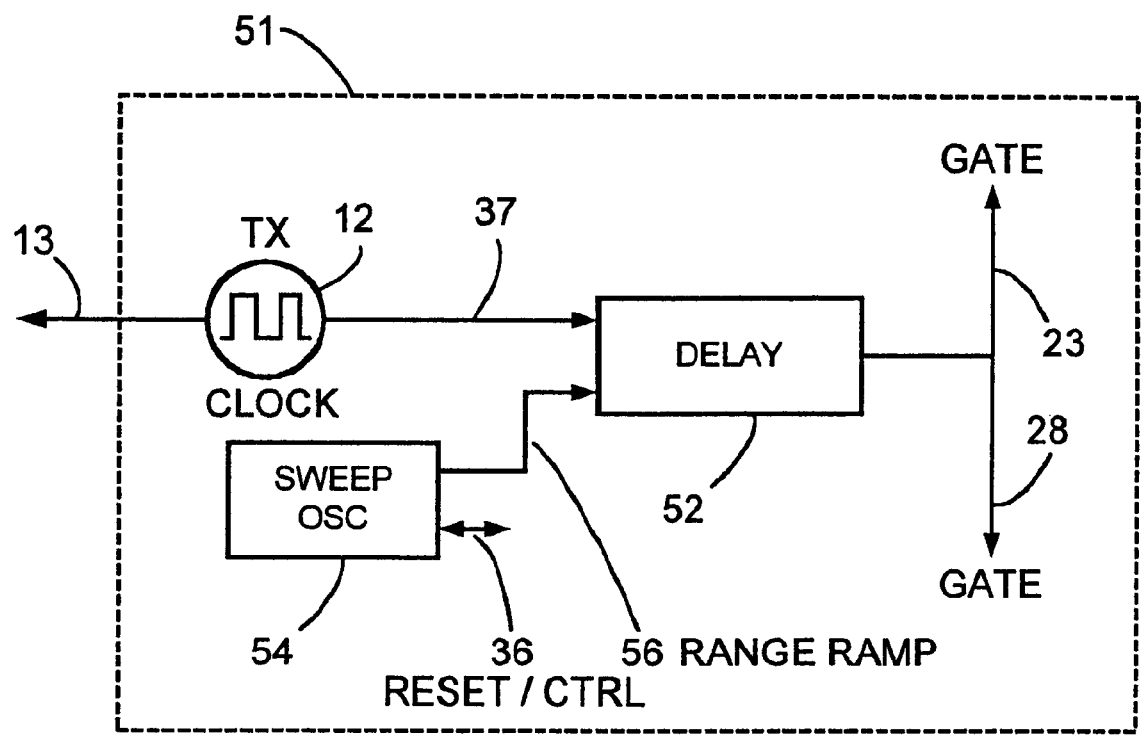
FIG. 2 is a block diagram of a swept delay timing system for alternative use in the system of FIG. 1.

FIG. 2 shows an alternative timing system 51 to the two-oscillator timing system 11 of FIG. 1. Delay element 52 receives transmit clock pulses via line 37 and outputs a delayed version via lines 23, 28 to the sampling receivers 20, 26. The delay introduced by delay 52 is swept over a range of delays by sweep generator 54. Generally sweep generator 54 provides a voltage ramp on line 56 to control the delay of delay element 52. A typical range of delays may be from 0 to 50 nanoseconds. Sweep generator 54 also may receive a sweep reset via RESET/CTRL line 36 or output a reset or other control pulse on line 36 to synchronize processing functions. For precision, delay element 52 may be comprised of a Delay Locked Loop (DLL) which converts the phase between the TX and RX CLOCK signals on lines 37, 39 to a voltage and compares that voltage to a RANGE RAMP voltage on line 56 and adjusts delay 52 to bring a control loop within delay element 52 into equilibrium, thereby accurately setting the relative TXRX CLOCK signal delay, or phase, according to the RANGE RAMP control input on line 56. Examples of DLL architectures are disclosed in U.S. Pat. No. 5,563,605, "Precision Digital Pulse Phase Generator" by McEwan, and in U.S. Pat. No. 6,055, 287, "Phase-Comparator-Less Delay Locked Loop" by McEwan.

Figure 3:
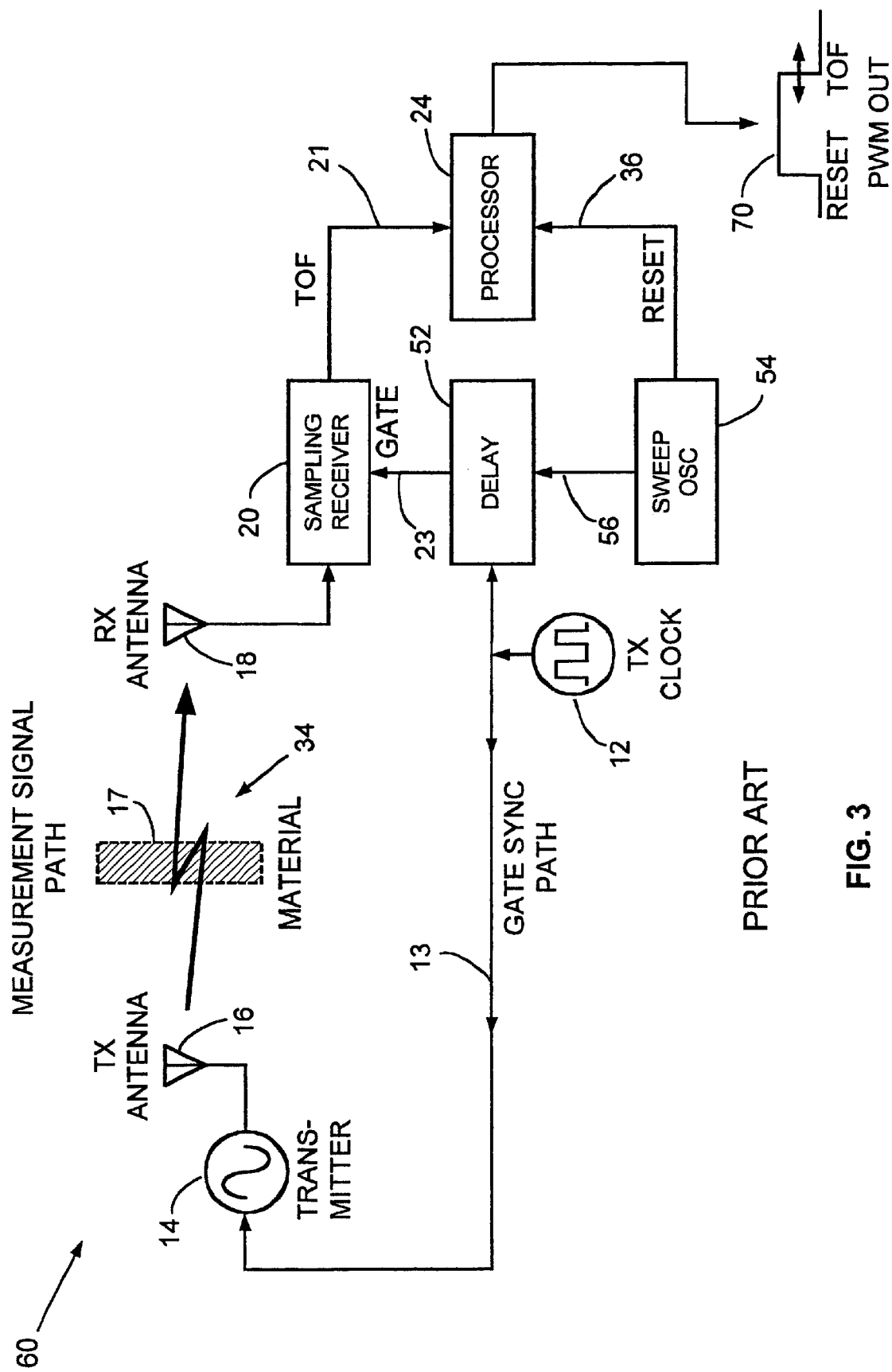
FIG. 3 (prior art) is a block diagram of a non-differential time-of-flight measurement system.

FIG. 3 (prior art) is a representation of a time-of-flight transmitter-receiver system 60 seen in U.S. Pat. Nos. 5,510, 800 and 5,661,490, "Time-of-Flight Radio Location System" by McEwan. A transmit TX clock 12 produces transmit clock pulses on line 13 to drive a transmitter 14. Transmitter 14 is coupled to a TX antenna 16, for radiation into a propagating medium 17.

A receive RX antenna 18, receives signals radiated by TX antenna 16 and passing through medium 17, and couples electrical pulses to a receiver 20, which is a gated, sampling type receiver. Sampling gate pulses to receiver 20 are obtained from delay element 52 via line 23.

Receiver 20 outputs a number of integrated samples to a baseband processor 24 which outputs a pulse width modulation (PWM) pulse 70 having a pulse width proportional to the time-of-flight from the TX antenna to the RX antenna in equivalent time.

Processor 24 forms a PWM pulse 70, which starts with a reset pulse on line 58 from sweep generator 54, labeled RESET, and ends with a pulse from receiver 20, labeled TOF on line 21. Thus, the width of the PWM pulse depends on the time difference between the RESET pulse and the time-of-flight delay time of path 34 (in equivalent time). Unfortunately, cable delays associated with antennas 16, 18, receiver drift, and timing delays associated with the receive clock on line 23 do not cancel out. Thus, the prior art cannot achieve the high level of precision offered by the present invention.

The outputs of receivers 20, 26 are processed into a PWM OUT signal 30 to indicate antenna-to-antenna time-of-flight range or to indicate material properties. The duration of PWM OUT indicates the time difference between the second receiver 26 output REF and the first receiver 20 output TOF, and represents the actual time-of-flight of a pulse across measurement path 34, which may include air, a vacuum and/or medium 34. Medium 34 may include water or oil in a tank, or wood, or paper or grain.

Thus the invention provides a high accuracy range measurement system between the transmit and receive antennas. The system can also be used to determine properties of material between the antennas.

The differential time-of-flight measurement system of the present invention can measure the propagation delay though a tank of water or oil or other fluid to non-invasively indicate a fill level in the tank. Non-invasive sensing facilitates difficult measurements such as in tanks containing debris, e.g., black water tanks in recreational vehicles.

The present invention can also sense grain moisture during harvesting or processing, since propagation time varies with the square-root of dielectric constant. This is possible because the dielectric constant of water or moisture is ~80, and small amount of moisture in the grain greatly increases the net dielectric constant compared to dry grain, which has a dielectric constant of ~3. Similar reasoning applies to sensing moisture in fuel.

The thickness and moisture content of wood or paper can be measured by sensing the propagation delay through it with the present invention. Other applications include, but are not limited to robotics, safety, material thickness measurement, and material dielectric constant measurement.

Changes and modifications in the specifically described embodiments can be carried out without departing from the scope of the invention which is intended to be limited only by the scope of the appended claims.

What is claimed is:

1. An apparatus for measuring the time-of-flight of a pulse, comprising:

a transmitter which transmits a sequence of transmitted pulses in response to a transmit timing signal;

a first receiver which samples the sequence of transmitted pulses with controlled timing, in response to a receive timing signal, and generates a time-of-flight sample signal in response to the receive timing signal;

a second receiver which samples the transmit timing signal with controlled timing, in response to the receive timing signal, and generates a non-time-of-flight reference sample signal in response to the receive timing signal;

a signal processor responsive to the time difference between the time-of-flight sample signal and the non-time-of-flight reference sample signal.

2. The apparatus of claim 1 wherein the transmitted pulses are RF pulses.

3. The apparatus of claim 1 wherein the transmitted pulses are transmitted through a medium for purposes of measurement or control.

4. The apparatus of claim 3 wherein the medium is water or oil in a tank, or wood or paper or grain.

5. An apparatus comprising:

a receive antenna, a transmit antenna for transmitting pulses to the receive antenna, a transmitter coupled to the transmit antenna and responsive to a transmit timing signal, a first receiver coupled to the receive antenna and responsive to a receive gate signal and sampling received pulses from the receive antenna, a second receiver sampling the transmit timing signal in response to the receive gate signal, a timing system comprising:
   first and second clock oscillators,
   the first clock oscillator providing the transmit timing signal at a first oscillator frequency to the transmitter,
   the second clock oscillator providing to the first and second receivers the receive gate signal having a frequency that differs by a small offset A from the first oscillator frequency, a processor responsive to the first and second receivers.

6. The apparatus of claim 5 wherein the transmitted pulses are RF pulses.

7. The apparatus of claim 5 wherein the received pulses are received through a medium for purposes of measurement or control.

8. The apparatus of claim 7 wherein the medium is water or oil in a tank, or wood or paper or grain.

9. An apparatus comprising:

a transmit antenna, a receive antenna, a transmitter coupled to the transmit antenna and responsive to a transmit timing signal, a first receiver coupled to the receive antenna and responsive to a receive gate signal and sampling received pulses from the receive antenna, a second receiver sampling the transmit timing signal in response to the receive gate signal, a timing system comprising:
   a clock oscillator,
   a delay sweep circuit,
   a delay circuit responsive to the delay sweep circuit,
   the clock oscillator providing the transmit timing signal to the transmitter,
   the delay circuit providing to the first and second receivers the receive gate signal that is swept across a range of delays relative to the transmit timing signal, a processor responsive to the first and second receivers.

10. The apparatus of claim 9 wherein the received pulses are RF pulses.

11. The apparatus of claim 9 wherein the received pulses are received through a medium for purposes of measurement or control.

12. The apparatus of claim 11 wherein the medium is water or oil in a tank, or wood or paper or grain.

13. A method for measuring pulse time-of-flight, comprising:

transmitting a sequence of pulses in response to a transmit timing signal;

sampling, with a first receiver, the transmitted pulses;

sampling, with a second receiver, the transmit timing signal;

processing the samples from the first and second receivers using a time differencing operation to form a time-of-flight indication.

14. The method of claim 13 wherein the sequence of pulses are RF pulses.

15. The method of claim 13 further comprising sampling transmitted pulses received through a-medium for purposes of measurement or control.

16. The method of claim 15 wherein the medium is water or oil in a tank, or wood or paper or grain.

* * * * *